United States Patent [19]

Podrapsky et al.

[11] 4,178,892
[45] Dec. 18, 1979

[54] SPEED-DEPENDENT IGNITION TIME ADVANCEMENT APPARATUS IN MAGNETO GENERATOR IGNITION SYSTEMS

[75] Inventors: Jiri Podrapsky, Buchschwabach; Josef Orova, Schwabach, both of Fed. Rep. of Germany

[73] Assignee: Robert Bosch GmbH, Stuttgart, Fed. Rep. of Germany

[21] Appl. No.: 874,651

[22] Filed: Feb. 2, 1978

[30] Foreign Application Priority Data

Mar. 23, 1977 [DE] Fed. Rep. of Germany ....... 2712695

[51] Int. Cl.² .......................... F02P 5/04; H03K 17/64
[52] U.S. Cl. .............................. 123/117 R; 123/148 E; 315/209 T
[58] Field of Search ........ 123/148 CC, 148 E, 149 D, 123/117 R, 146.5 A; 315/209 T, 209 M

[56] References Cited

U.S. PATENT DOCUMENTS

| | | | |
|---|---|---|---|
| 3,277,875 | 10/1966 | Miki | 123/117 R |
| 3,626,455 | 12/1971 | Toda et al. | 123/117 R |
| 3,900,016 | 8/1975 | Haubner et al. | 123/148 CC |
| 3,948,239 | 4/1976 | Katsumata | 123/146.5 A |
| 3,965,878 | 6/1976 | Salway | 123/148 E |
| 3,985,109 | 10/1976 | Kondo et al. | 123/146 CC |
| 4,086,895 | 5/1978 | Habert | 123/117 R |
| 4,119,868 | 10/1978 | Schach et al. | 315/209 T |

*Primary Examiner*—Charles J. Myhre
*Assistant Examiner*—P. S. Lall
*Attorney, Agent, or Firm*—Frishauf, Holtz, Goodman & Woodward

[57] ABSTRACT

In an ignition system having a magneto, the ignition timing is advanced when the engine speed exceeds a predetermined speed, by abruptly changing the voltage applied to the base of a transistor having an emitter-collector circuit connected in series with the primary winding of the ignition coil. The change in base voltage is such that the primary current flowing before the ignition time is decreased, increasing the primary voltage and thereby advancing the ignition time when the speed of the engine reaches the predetermined speed. The abrupt change is generated by opening or closing a switch which connects a resistor in series or parallel, respectively, with a resistor connected to the base of the transistor. The speed dependent switch may be a transistor whose conductive or non-conductive state is determined by the charge and discharge of a capacitor which, in turn, varies as a function of engine speed.

6 Claims, 4 Drawing Figures

SPEED-DEPENDENT IGNITION TIME ADVANCEMENT APPARATUS IN MAGNETO GENERATOR IGNITION SYSTEMS

Cross reference to related application, assigned to the assignee of this application: U.S. Ser. No. 875,684, filed Feb. 6, 1978, PODRAPSKY et al (Attorney Docket FF 7489; R. 3757; claiming priority of German Application P 27 09 745.6 of Mar. 5, 1978).

The present invention relates to ignition systems having a magneto generator and, more prticularly, to such systems wherein it is desired to advance the ignition time at higher engine speeds.

BACKGROUND AND PRIOR ART

In the known ignition system utilizing a magneto, an ignition starting transistor, which is connected in series with the primary winding, is switched to the conductive state at the beginning of the positive voltage half wave in the primary winding of the ignition coil. Primary current therefore flows, which causes a strong magnetic field to be generated in the armature of the magneto generator. When the voltage reaches the maximum value, a threshold element breaks down. This activates a control switch which in turn blocks the ignition starting transistor, thereby interrupting the primary current. A high voltage is therefore induced in the secondary winding of the ignition coil causing a spark to be formed at the spark plug connected thereto.

To give the system the capability of changing the ignition timing, a first and second voltage half wave are generated in the primary circuit. The amplitude of the second half wave is larger than that of the first. At lower engine speeds, the threshold element which causes the initiation of the ignition process responds only to the half wave having a large amplitude. Since, for increasing engine speeds, the induced voltages in the primary circuit also increase, the threshold element will respond to the smaller half wave in the higher speed ranges. The ignition timing is therefore changed by a predetermined amount, that is advanced by a predetermined amount, when the engine speed reaches a predetermined speed.

Ignition systems, and, particularly, ignition systems used in smaller combustion engines, should be kept at as low in price and require as little space as possible. Therefore, for generating the ignition energy, a permanent magnet is utilized which is rotated by means of a fly wheel or a fan wheel which, in turn, is driven by the engine. The pole shoes of the magnet interact with an armature fastened to the motor housing and having a U shaped or E shaped iron core. In order to generate the above mentioned two sequential positive half waves, the primary voltage must be rectified by power diodes. Further, since the first half wave must be smaller than the second, damping circuits are required, which, in some instances, serve to determined the predetermined speed at which the ignition time is advanced.

It is a further disadvantage of the known system, that the ignition angle, that is the angle by which the ignition timing is advanced when the predetermined engine speed is reached, is, to a great extent, determined by the dimensions of the iron core and of the pole shoes of the permanent magnet and therefore cannot be readily adapted to the requirements of the individual engine.

The Invention

It is an object of the present invention to furnish an ignition system which is as simple as possible and yet readily adaptable to the requirements of a particular engine. Further the system is to be reliable and inexpensive.

The present invention provides an ignition system which has the advantage that only a single half wave of the primary voltage is required for each ignition process. This greatly simplifies the construction of the ignition system.

Briefly, in the present invention, advantage is taken of the fact that the emitter-collector circuit of the ignition starting transistor constitutes controllable impedance means, the impedance of which varies as a function of the signal applied to the control electrode. Therefore, switch means are provided which change the control signal applied to the control electrode at the higher speeds in a direction decreasing the flow of primary current, thereby increasing the voltage across the primary winding of the ignition coil. The latter increase advances the ignition timing.

In a preferred embodiment the switch means comprises a resistor and a speed-dependent switch connected either in series or in parallel with a base resistor already present in the circuit. When the connection is a series connection the switch is opened at low speeds and closed at high speeds. The opposite conditions prevail for the parallel connection.

Preferred embodiments of the invention are shown in the drawing, in which.

Figure 1:
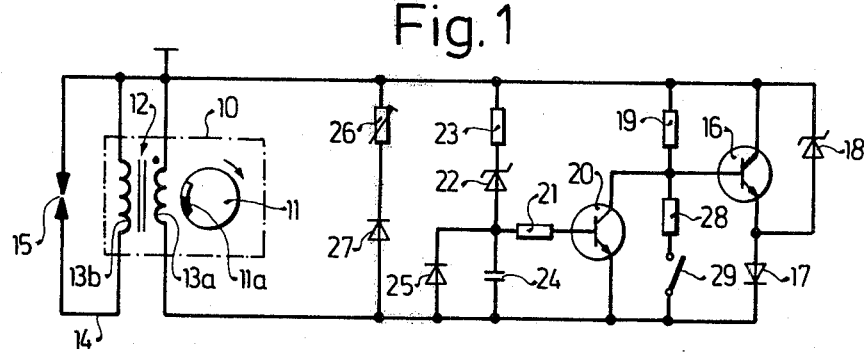
FIG. 1 shows a first embodiment of the present invention.
Figure 3:
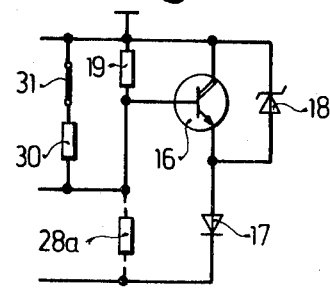
FIG. 3 is a second embodiment of the present invention.
Figure 4:
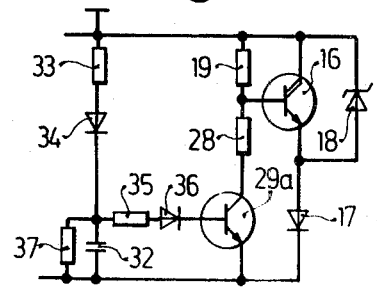

and FIG. 4 is a preferred embodiment of the speed-dependent switch of FIGS. 1 and 3.

FIG. 1 is a circuit diagram of the ignition system for a single cylinder internal combustion engine which is energized by a magneto 10. Magneto 10 includes a rotating magneto system 11 which includes a permanent magnet 11a arranged between two pole shoes and mounted on the outer perimeter of a fly- or fan-wheel of the engine. The magneto system 11 cooperates with an armature 12 which is mounted in the housing of the engine. The armature also serves as the ignition coil and has a primary winding 13a and a secondary winding 13b. The secondary winding is connected through a cable 14 to a spark plug 15. The primary winding 13a is connected to a primary circuit which includes an ignition starting transistor 16 which is an NPN transistor. The emitter of transistor 16 is connected through a diode 17 to one end of primary winding 13a. Its collector is connected to the other end of winding 13a, namely the end which is connected to the reference potential. Diode 17 serves to block inverse currents. To prevent overvoltages, a diode 18 is connected in parallel with the emitter-collector circuit of transistor 16.

The emitter-collector circuit of a transistor 20 is connected in parallel with the emitter-base circuit of transistor 16. The base of transistor 20 is connected through a resistor 21 to the anode of a Zener diode 22 whose cathode is connected through a resistor 23 to the reference potential. The anode of Zener diode 22 is connected through the parallel combination of a capacitor 24 and a diode 25 to the other end of winding 13a. Also connected in parallel with winding 13a is an adjustable resistor 26 in series with a diode 27. Diodes 25 and 27 are conductive during the positive half wave of the voltage across winding 13a. It is the negative half wave which is utilized for ignition. Adjustment of resistor 26 allows selective damping of the positive half wave.

In order to advance the ignition time at higher engine speeds, a resistor 28 in series with a normally open switch 29 is connected in parallel with the emitter-collector circuit of transistor 20. Switch 29 is a frequency dependent switch. Specifically, it is open when the speed of the engine is less than the predetermined speed and it is closed when the speed of the engine exceeds the predetermined speed.

Figure 2:
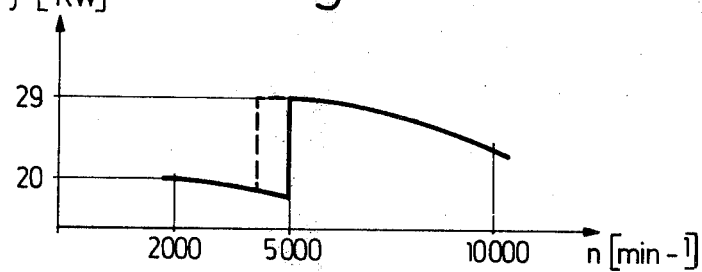
FIG. 2 is a characteristic curve of ignition angle vs. speed for the ignition system of FIGS. 1 and 3.

FIG. 2 shows a curve of ignition angle plotted against engine speed. When idling, the ignition timing should correspond to about 20 degree camshaft rotation ahead of the top dead center position of the piston for stability and to assure a relatively clean exhaust. As the engine speed increases, the ignition timing is somewhat delayed because of the armature reaction of the magneto generator 10. At an engine speed of about 5,000 rotations per minute, a sudden change of ignition timing to approximately 29 degrees of camshaft rotation preceding the top dead center position takes place. Again, as the engine speed increases, the ignition timing will be somewhat delayed relative to the new starting point of 29 degrees of camshaft rotation.

Operation

Positive and negative voltage half waves are induced in the primary winding 13a of armature 12 by the rotating magneto system 11. When viewed from the terminal of primary winding 13a which is connected to the reference potential, positive voltage waves are damped sufficiently by diode 27 and resistor 26 that they do not damage any of the elements in the circuit. The negative voltage half waves are utilized to furnish the ignition energy and to initiate the spark. At the beginning of each negative voltage half wave, a control current flows through resistor 19 to the base-emitter circuit of transistor 16, thereby causing transistor 16 to become conductive. Primary current therefore flows through the emitter-collector circuit of transistor 16. If the voltage across the primary winding reaches the threshold value of approximately 4 volts of Zener diode 22, this diode becomes conductive and a current flows over resistor 23 which charges capacitor 24. At the ignition time, the voltage across capacitor 24 reaches the threshold of transistor 20 whose base is connected to capacitor 24 through resistor 21. Transistor 20 become conductive. Its emitter-collector circuit short-circuits the base-emitter circuit of transistor 16, causing transistor 16 to switch to the blocked state instantaneously. The primary current is thus suddenly interrupted, thereby causing a high voltage pulse to be induced in primary winding 13a and in secondary winding 13b. The high voltage pulse in secondary winding 13b causes a spark to be generated at spark plug 15. Since resistor 21 at the base of transistor 20 retards the discharge of capacitors 24 and 31 and since, in addition, the voltage pulse appearing across primary winding 13a is applied through Zener diode 22 to the base of transistor 20, transistor 20 will remain conductive throughout the ignition process, causing transistor 16 to remain blocked. To protect transistor 16 from overvoltages, Zener diode 18 limits the voltage appearing across the primary to about 300 volts.

As mentioned above, the armature reaction of the magneto causes increasing delays of the negative voltage half wave with increasing engine speed. Since, however, the rate of rise of voltage increases with increasing speed, the actual delay in ignition timing in the intermediate speed range is relatively small even when no compensatory measures are taken. However, to improve the efficiency of the engine it is desirable to advance the ignition timing when the engine reaches a predetermined speed. This speed is 5,000 r.p.m. in the embodiment shown in FIG. 1 for which the characteristic curve is shown in FIG. 2. To achieve this sudden advance in ignition timing, switch 29 is closed at the predetermined speed. This causes resistor 28 to form a voltage divider with resistor 19. This voltage divider causes the voltage applied to the base of transistor 16 to be decreased prior to the ignition time. The impedance of the emitter-collector circuit of transistor 16 is increased, causing a decrease in the primary current. The decrease in primary current in turn results in a increase in the primary voltage. This increase in primary voltage causes the threshold value of Zener diode 22 to be reached at an earlier time in the cycle. The ignition time is thereby advanced. The actual advance depends upon the value of resistor 28. Typical values of resistors 19 and 28 are dependent on the type of transistor 16:

resistor 17—390 Ω÷3 kΩ
resistor 28—300 Ω÷1 kΩ

FIG. 3 shows an alternate embodiment utilizing a normally closed switch 31. A resistor 30 is connected in parallel with resistor 19 when switch 31 is closed. A resistor 28a may be connected between the base of transistor 16 and the side of winding 13a not connected to reference potential, if temperature compensation is required.

Operation

When the speed of the engine reaches the predetermined speed, switch 31 is opened, thereby increasing the resistance in the base circuit of transistor 16. Again, the emitter-collector impedance is thereby increased, causing the circuit to operate as described with reference to FIG. 1.

FIG. 4 shows a preferred embodiment of the speed-dependent switch 29 of FIG. 1. Specifically, the emitter-collector circuit of a transistor 29a is connected in series with resistor 28. A capacitor 32 has a first terminal connected to the emitter of transistor 29a and a second terminal connected to reference potential through a resistor 33 and a diode 34. A resistor 37 is connected in parallel with capacitor 32. Capacitor 32 is also connected through a resistor 35 and diode 36 to the base of transistor 29a. Diode 34 is a decoupling diode which prevents the charging of capacitor 32 during the positive half wave.

Operation

In the lower speed range, transistor 29a is in the blocked condition, since resistor 33 and capacitor 32 are so-chosen that the voltage across capacitor 32 does not reach the voltage required to switch transistor 29a to the conductive state. Further, capacitor 32 can discharge fully through resistor 37 at the end of each negative half wave. However, when the speed of the engine reaches the predetermined speed, the amplitude of voltage across the primary winding has increased to a sufficient extent that the voltage across capacitor 32 becomes sufficient to exceed the threshold of transistor 29a. Further, the capacitor is now unable to discharge fully during the positive half wave. The emitter-collector circuit of transistor 29a is thus conductive prior to the ignition time, causing resistor 28 to be connected into the circuit. The operation of the circuit described with reference to FIG. 1 then ensues. This type of speed dependent switch causes a hysteresis to be introduced into the system as indicated by the dashed line in FIG. 2. Specifically, a decrease in speed to approximately 4,500 r.p.m. is required until the time between successive negative half waves of the increased primary voltage is such as to allow capacitor 32 to discharge through capacitor 37 to the extent required to cause transistor 29a to switch to the blocked state.

The invention is not to be limited to the embodiments shown, since various modifications and changes can be made in system. For example, the speed dependent switch could be arranged in parallel with a resistor in the base-emitter circuit of transistor 16. Alternately, a resistor could be connected in series with resistor 28, the further resistor then being short-circuited by switch 29. The circuit of FIG. 3 could be modified in that resistor 30 could be omitted while a resistor connected in series with resistor 19 could be short-circuited by switch 31 in the lower speed range.

Instead of the electronic switch shown in FIG. 4, a centrifugal switch, a Hall generator or any other known speed dependent switch could be utilized as switch 29 or 31.

Various changes and modifications may be made within the scope of the inventive concept.

We claim:

1. In an ignition system for an internal combustion engine, said ignition system having a rotating magneto system driven by said engine and armature means including a primary winding (13a) and a second winding (13b) cooperating with said rotating magneto system, a spark plug connected to said secondary winding, controllable impedance means (16) having a controlled impedance circuit connected in series with said primary winding and having a control electrode for changing the impedance of said controlled impedance circuit in accordance with a control signal applied to said control electrode and for interrupting current flowing through said primary winding in response to an ignition timing signal applied to said control electrode, and means (20-25) connected to said primary winding and said control electrode for furnishing said ignition timing signal to said control electrode when the voltage across said primary winding reaches a predetermined voltage, apparatus for abruptly advancing the ignition timing when the speed of said engine exceeds a predetermined speed, comprising bistable means (29; 31) having a first and second stable state when said speed of said engine is less than and greater than said predetermined speed, respectively, connected to said control electrode for causing said controlled impedance circuit to have a greater impedance prior to the ignition time when said bistable means is in said second stable state than when said bistable means is in said first stable state, thereby advancing said ignition timing at higher engine speeds.

2. A system as set forth in claim 1, wherein said switch means comprises the emitter-collector circuit of a transistor (29a) said transistor having a base, and switch control means (32-37) connected to said primary winding and said base of said transistor, for maintaining said emitter-collector circuit in said first state when the speed of said engine is less than said predetermined speed and in said second state when the speed of said engine exceeds said predetermined speed.

3. A system as set forth in claim 2, wherein said switch control means comprises a capacitor (32) and means for charging (33, 34) and discharging (37) said capacitor during sequential half waves of voltage across said primary winding.

4. A system as set forth in claim 1, further comprising a base resistor (19) connected between said primary winding and said control electrode;

and wherein said switch means is connected in parallel with said base resistor.

5. A system as set forth in claim 4, wherein said switch is in the conductive and non-conductive state when the speed of said engine is less than and greater than said predetermined speed, respectively.

6. A system as set forth in claim 1, wherein said controllable impedance means comprises a control transistor having a collector-emitter circuit connected in series with said primary winding and a base electrode constituting said control electrode; and wherein said bistable means comprises a transistor switch (29), a resistor (28) connected in series with said transistor switch, and means for connecting the so-formed series circuit to said base electrode of said control transistor.

* * * * *